United States Patent
Bang et al.

(10) Patent No.: US 8,470,281 B2
(45) Date of Patent: Jun. 25, 2013

(54) METHOD OF PRODUCING CARBONATE USING CARBON DIOXIDE MICROBUBBLES AND CARBONATE THEREOF

(75) Inventors: Jun Hwan Bang, Daejeon (KR); Young Nam Jang, Daejeon (KR)

(73) Assignee: Korea Institute of Geosciences and Mineral Resources, Daejon (KR)

( * ) Notice: Subject to any disclaimer, the term of this patent is extended or adjusted under 35 U.S.C. 154(b) by 0 days.

(21) Appl. No.: 13/095,469

(22) Filed: Apr. 27, 2011

(65) Prior Publication Data

US 2012/0114548 A1 May 10, 2012

(30) Foreign Application Priority Data

Nov. 10, 2010 (KR) .................. 10-2010-0111670

(51) Int. Cl.
*C01F 11/18* (2006.01)
(52) U.S. Cl.
USPC ............................ 423/431; 423/430; 423/432
(58) Field of Classification Search
USPC .......................................... 423/430, 431, 432
See application file for complete search history.

(56) References Cited

U.S. PATENT DOCUMENTS 5,376,343 A * 12/1994 Fouche ........................ 423/165
2005/0265911 A1 12/2005 Yuan

OTHER PUBLICATIONS

Smith et al., "Effect of calcium oxide dose on thermal reactions, lime speciation, and physical properties of alkaline stabilized biosolids." Water Environment Research, vol. 70, No. 2 (Mar./Apr. 1998), pp. 224-230.*
Page, Miles G. et al., "Improved Control of CaCO3 Precipitation by Direct Carbon Dioxide Diffusion: Application in Mesocrystal Assembly," Crystal Growth & Design, vol. 6, No. 8, pp. 1915-1920 (2006).

* cited by examiner

*Primary Examiner* — Stanley Silverman
*Assistant Examiner* — Daniel Berns
(74) *Attorney, Agent, or Firm* — Edwards Wildman Palmer LLP

(57) ABSTRACT

Disclosed herein is a method of producing carbonate, comprising the steps of: providing a water-containing solution including cations that are precipitated in the form of a salt after undergoing a precipitation reaction with carbonate ions; and generating carbon dioxide microbubbles having a diameter of 50 μm or less in the water-containing solution to induce the precipitation reaction between the cations and the carbonate ions. The method is advantageous in that the carbonate produced using the microbubble system disclosed in the method can be practically used as high-priced building materials, filler for paper manufacturing, etc. and can also be used in foods, medicines and the like depending on the purity thereof, so that it can be recovered in a high yield. Further, the method is advantageous in that carbon dioxide is consumed, and cations can be effectively removed from waste water, so that it is environmentally useful.

6 Claims, 20 Drawing Sheets

METHOD OF PRODUCING CARBONATE USING CARBON DIOXIDE MICROBUBBLES AND CARBONATE THEREOF

CROSS REFERENCE TO RELATED APPLICATION

This application claims the benefit of Korean Patent Application No. 2010-0111670 filed on Nov. 10, 2010, the entire contents of which is incorporated by reference.

BACKGROUND OF THE INVENTION

1. Technical Field

The present invention relates to a method of producing carbonate using carbon dioxide microbubbles, and the carbonate thereof.

2. Description of the Related Art

Microbubbles are referred to as ultrafine bubbles having a diameter of 50 μm or less, the surface of each of which is electrically charged with anions. Microbubbles have been applied in various fields since a Japanese teacher first invented them.

Microbubbles can be generated in various ways, and, typically, can be generated using ultrasonic waves. In addition, microbubbles can be generated by passing water and air through a pressure reducing device such as an orifice or the like at a relatively high pressure to allow the air dissolved in water to be formed into innumerable particles by the pressure reducing device and then be discharged to the outside.

Currently, microbubbles are being used in various fields, such as the purification of water in reservoirs or fish farms, the etching and cleaning of semiconductor wafers, the washing of fruits or vegetables, and the like. Owing to such useful characteristics of microbubbles, they are being applied to more and more fields.

Meanwhile, carbonates are salts in each of which hydrogen of carbonic acid is substituted by a metal, and include a normal salt (carbonate), an acidic salt (hydrogen carbonate) and a basic salt. Carbonates can be practically used as high-priced building materials, filler for paper manufacturing, etc. and can also be used in foods, medicines and the like depending on the purity thereof. Therefore, carbonates are greatly advantageous economically.

Generally, carbonates are produced by absorbing carbon dioxide into a solid or aqueous metal oxide or metal hydroxide. However, this method is problematic in that carbonates cannot be produced in high yield because the absorption of carbon dioxide is low. Further, as part of the mineral carbonation technology, a method of producing carbonate by reacting carbonate ions with a rock or mineral containing cations is known.

SUMMARY OF THE INVENTION

Accordingly, the present invention has been devised to solve the above-mentioned problems, and an object of the present invention is to provide a novel method of producing carbonate using carbon dioxide bubbles.

In order to accomplish the above object, an aspect of the present invention provides a method of producing carbonate, comprising the steps of: providing a water-containing solution including cations that are precipitated in the form of a salt after undergoing a precipitation reaction with carbonate ions; and generating carbon dioxide microbubbles having a diameter of 50 μm or less in the water-containing solution to induce the precipitation reaction between the cations and the carbonate ions.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1A:
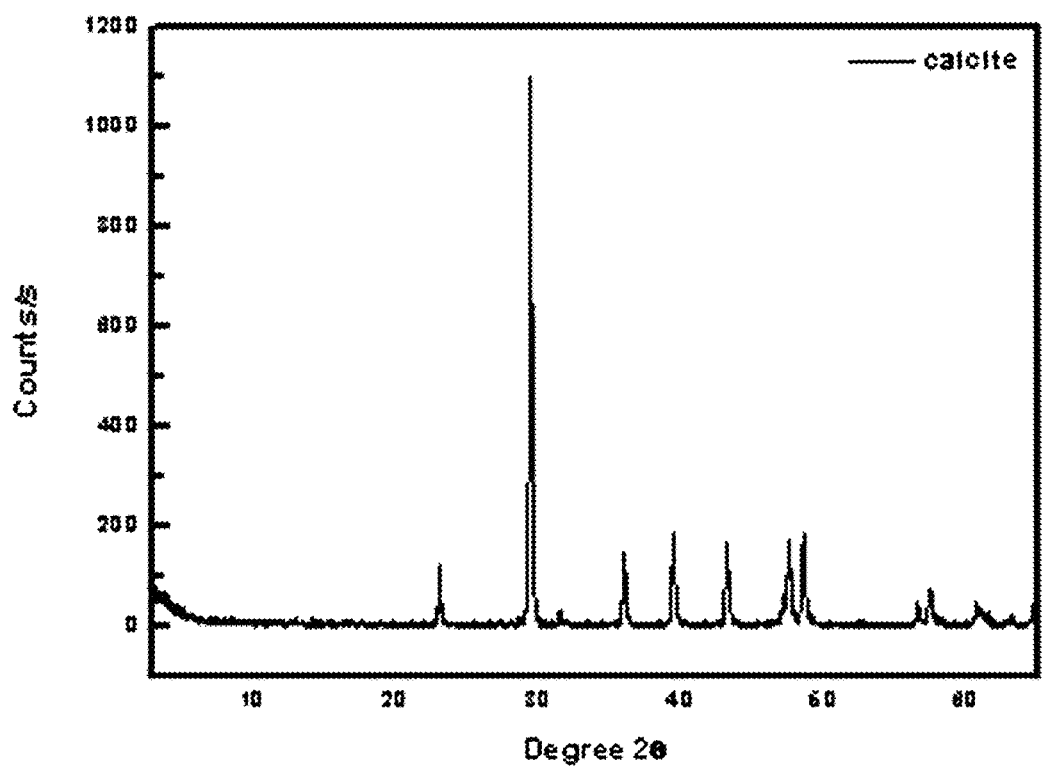
FIG. 1A is an XRD (X-ray diffraction) graph of the crystals obtained by the experiment of Example 1.

Hereinafter, preferred embodiments of the present invention will be described in detail with reference to the attached drawings.

The present invention provides a method of producing carbonate, comprising the steps of: providing a water-containing solution including cations that are precipitated in the form of a salt after undergoing a precipitation reaction with carbonate ions; and generating carbon dioxide microbubbles having a diameter of 50 μm or less in the water-containing solution to induce the precipitation reaction between the cations and the carbonate ions.

In the present invention, carbonate is produced by reacting carbon dioxide microbubbles having a diameter of 50 μm or less with cations. In the case where microbubbles are used, the solubility of gas can be maintained in a high level for several minutes because innumerable micrometer-size bubbles can be dissolved in a solvent. That is, when carbon dioxide is put into a microbubble generator and then circulated together with water, carbon dioxide microbubbles are generated, and thus the solubility of carbon dioxide in a solvent can be maintained in a high level for several minutes. The carbon dioxide microbubbles serve as very small reactors containing carbonates ions. Therefore, when cations which can react with carbonate ions are suitably supplied, the carbon dioxide bubbles can be recovered as carbonate after crystallizing.

Meanwhile, in the method of producing carbonate according to the present invention, the cations may be calcium ions ($Ca^{2+}$). When calcium ions ($Ca^{2+}$) are used as the cations, calcium carbonate is produced as the carbonate.

Further, in the method of producing carbonate according to the present invention, the water-containing solution may be an aqueous solution. Here, the term 'water-containing solution' means a solution containing water, and the term 'aqueous solution' means a solution in which half or more of a solvent is water.

Further, in the method of producing carbonate according to the present invention, the water-containing solution may be waste water. When carbon dioxide microbubbles having a diameter of 50 μm or less react with waste water containing cations, the cations present in the waste water can be precipitated in the form of carbonate and then the carbonate can be recovered. That is, the cations in the waste water are converted into the useful form of carbonate and then the carbonate is recovered. For this reason, resources can be reused, and various cations causing environmental pollution can be removed from waste water.

Further, in the method of producing carbonate according to the present invention, it is preferred that the reaction of cations with carbon dioxide microbubbles be conducted under an alkali condition of a pH equal to or greater than 7. Under such a condition, the amount of carbonate ions produced from carbon dioxide can be increased, thus increasing the production of carbonate.

Further, in the method of producing carbonate according to the present invention, it is preferred that the reaction of cations ($Ca^{2+}$) with carbon dioxide microbubbles be conducted by adding a salt that dissociates in the solution and thus exhibits electrolytic properties. The reason for this is because the solubility of calcium ions can be increased by the participation of electrolytic ions in the reaction. In this case, the salt participating in the reaction may be sodium chloride (NaCl).

Meanwhile, the present invention provides carbonate produced by the method of the present invention. Since the produced carbonate is precipitated in the solution, it can be easily separated from the solution at low cost. Further, the produced carbonate can be practically used as high-priced building materials, filler for paper manufacturing, etc. and can also be used in foods, medicines and the like depending on the purity thereof. That is, owing to the reaction of the present invention, resources can be reused, and waste water can be purified. Here, the produced carbonate may be calcium carbonate. In the case of calcium carbonate, the cations reacting with carbonate ions are calcium ions ($Ca^{2+}$).

Hereinafter, the present invention will be described in more detail with reference to the following Examples. However, the scope of the present invention is not limited thereto.

EXAMPLE 1

Production of calcium carbonate using $CaCl_2$ 0.25 M $CaCl_2$ was dissolved in water to form a solution, and then 6 M NaOH was added to the solution to adjust the pH of the solution to 11 or more. After the addition of NaOH, $Ca(OH)_2$ was prepared. Subsequently, $CO_2$ was injected into the solution at a flow rate of 0.3 L/min to generate carbon dioxide microbubbles for 7 minutes.

As the result of the experiment, calcium carbonate was produced in the form of calcite (refer to FIG. 1A). FIG. 1A is a XRD (X-ray diffraction) graph of the calcium carbonate crystals produced by the experiment of Example 1. In this experiment, calcite, which is the most stable form of calcium carbonate, was able to be obtained in a short time of 7 minutes without using an additive.

Figure 1B:
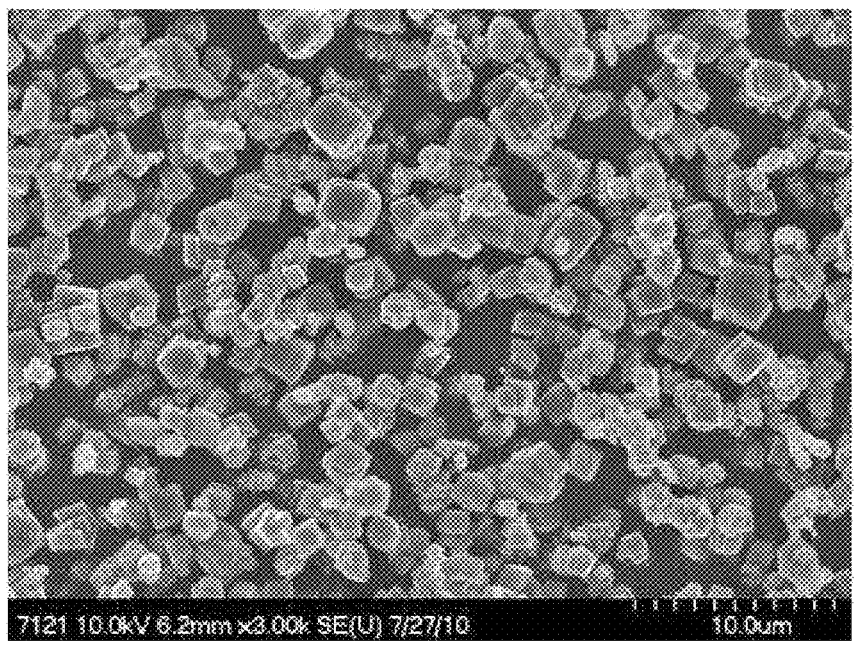
FIG. 1B is an SEM (scanning electron microscope) photograph of the crystals obtained by the experiment of Example 1.

Meanwhile, from the SEM (scanning electron microscope) photograph shown in FIG. 1B, it can be determined that the shape of the calcium carbonate crystals is identical to that of calcite crystal crystals and that the calcium carbonate crystals are well dispersed.

Figure 1C:
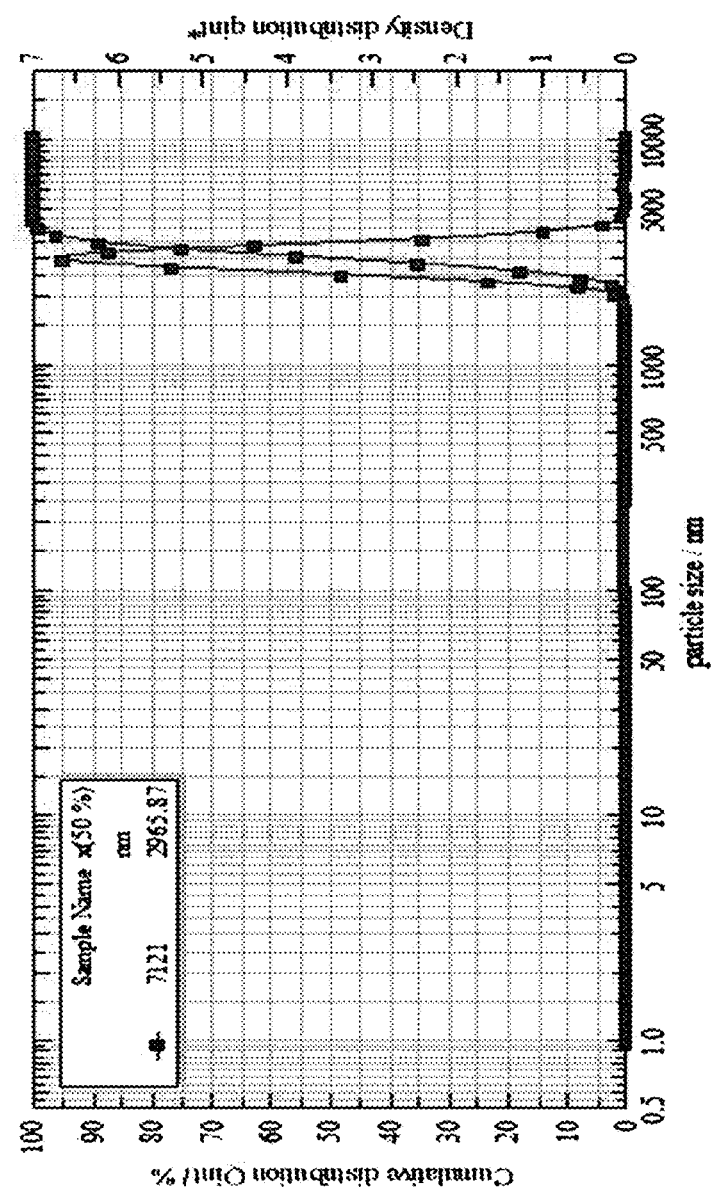
FIG. 1C is a graph showing the particle size distribution of the crystals obtained by the experiment of Example 1.

Further, as shown in FIG. 1C, it can be seen that the size of the singly-dispersed calcium carbonate crystals is about 3 μm.

EXAMPLE 2

Production of Calcium Carbonate Using $CaCl_2$ with the Addition of NaCl

In Example 2, calcium carbonate was produced under the same conditions as Example 1, except that 1 mM NaCl was added, and $CO_2$ was injected into the solution at a flow rate of 0.4 L/min, which is slightly higher than in Example 1.

Figure 2A:
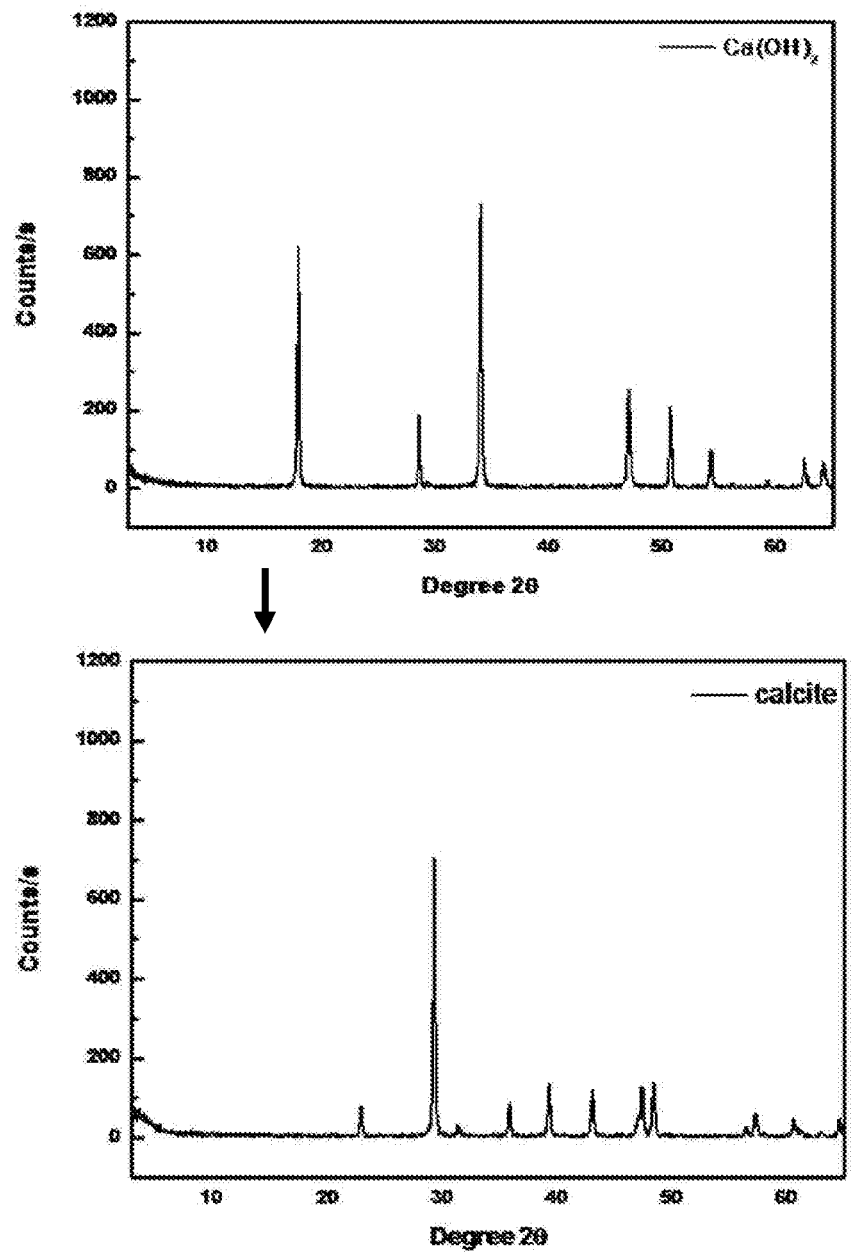
FIG. 2A shows XRD graphs of the crystals obtained by the experiment (NaCl was added) of Example 2 before and after the generation of carbon dioxide microbubbles.
Figure 2B:
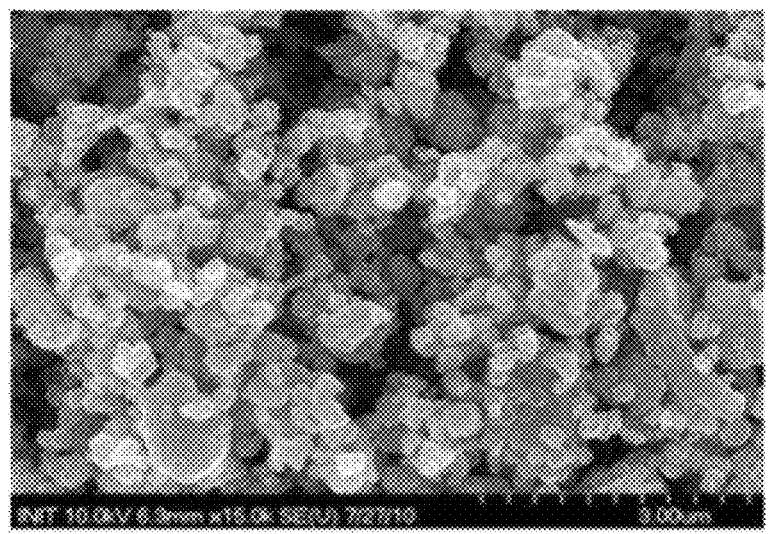
FIG. 2B shows SEM photographs of the crystals obtained by the experiment (NaCl was added) of Example 2 before and after the generation of carbon dioxide microbubbles.
Figure 2B:
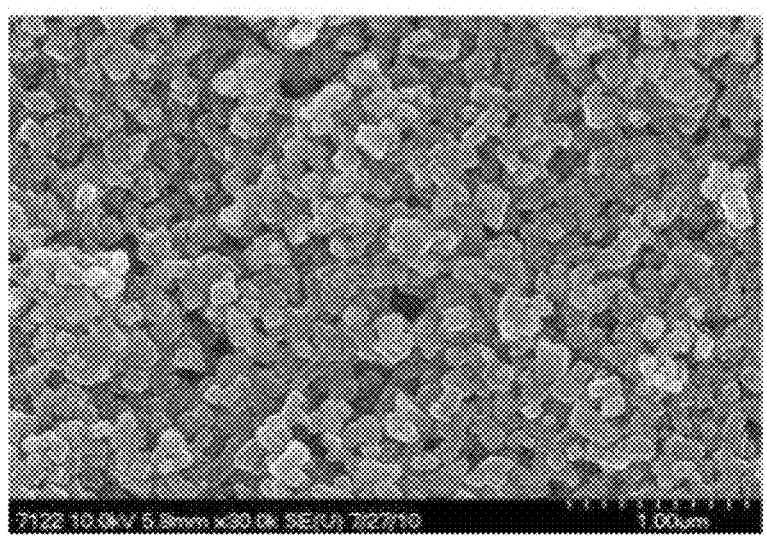
Figure 2C:
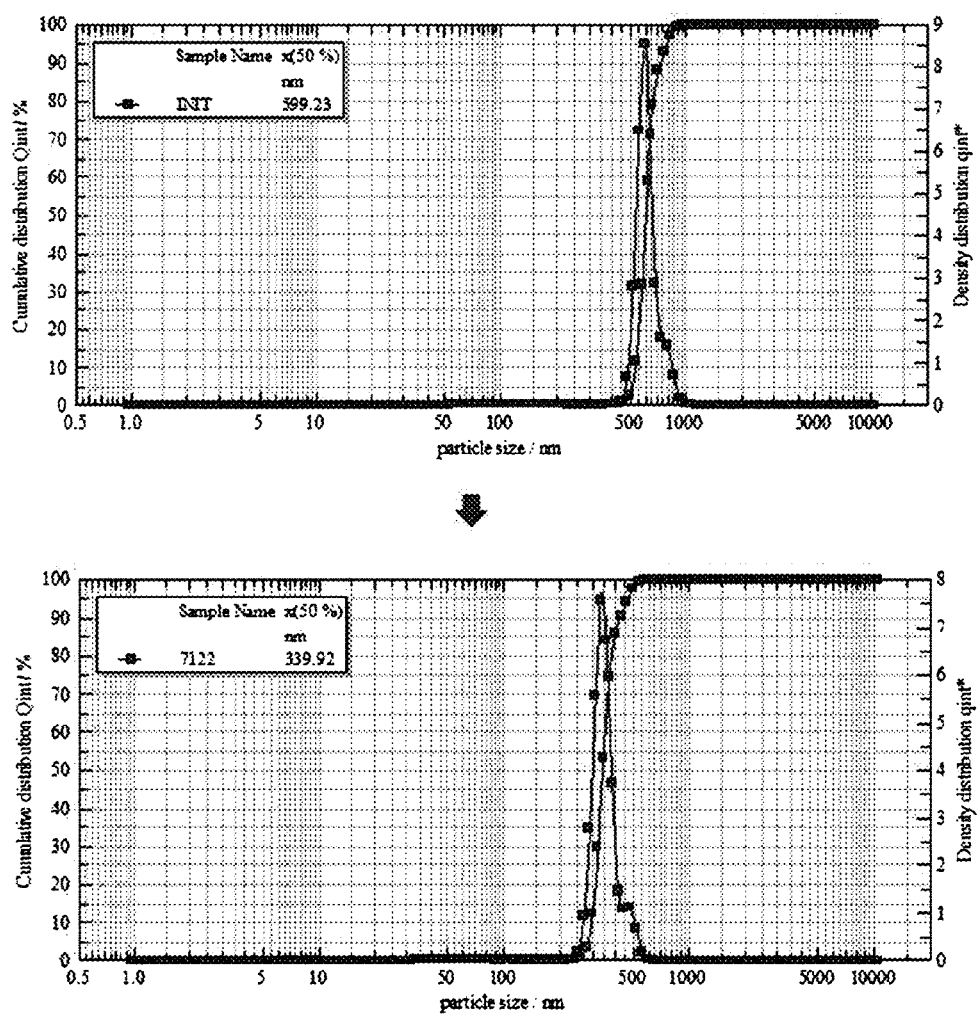
FIG. 2C shows particle size distribution graphs of the crystals obtained by the experiment (NaCl was added) of Example 2 before and after the generation of carbon dioxide microbubbles.
Figure 3A:
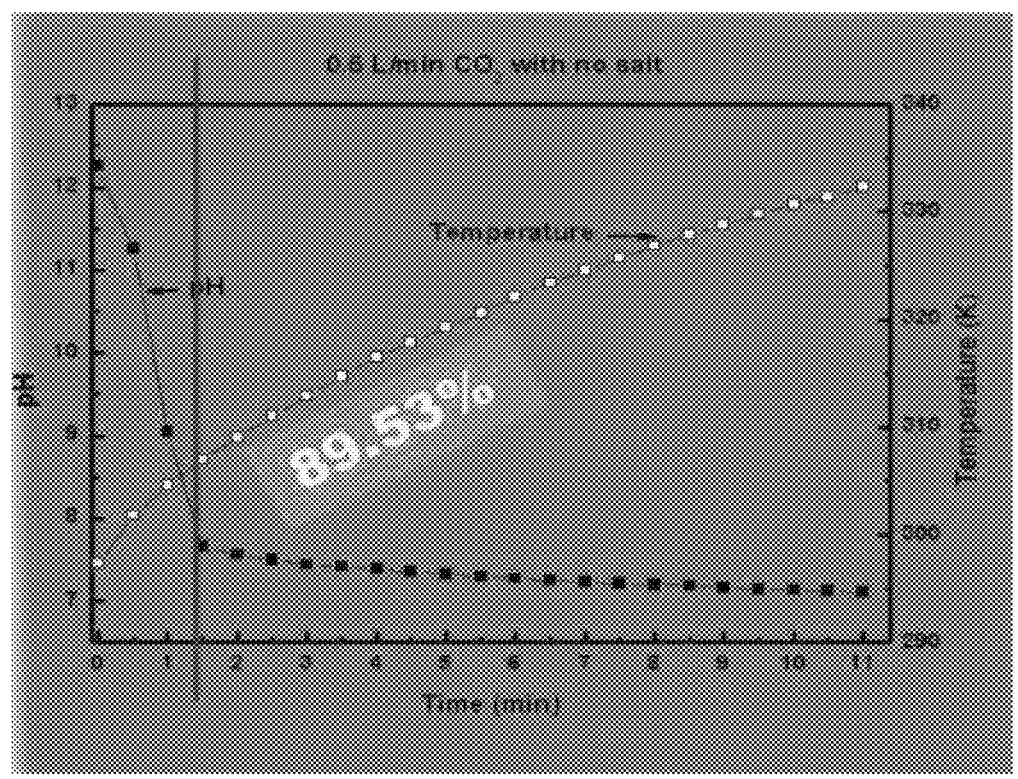
FIGS. 3A to 3D are graphs showing the reaction profiles of Examples 3 to 6, respectively.
Figure 3B:
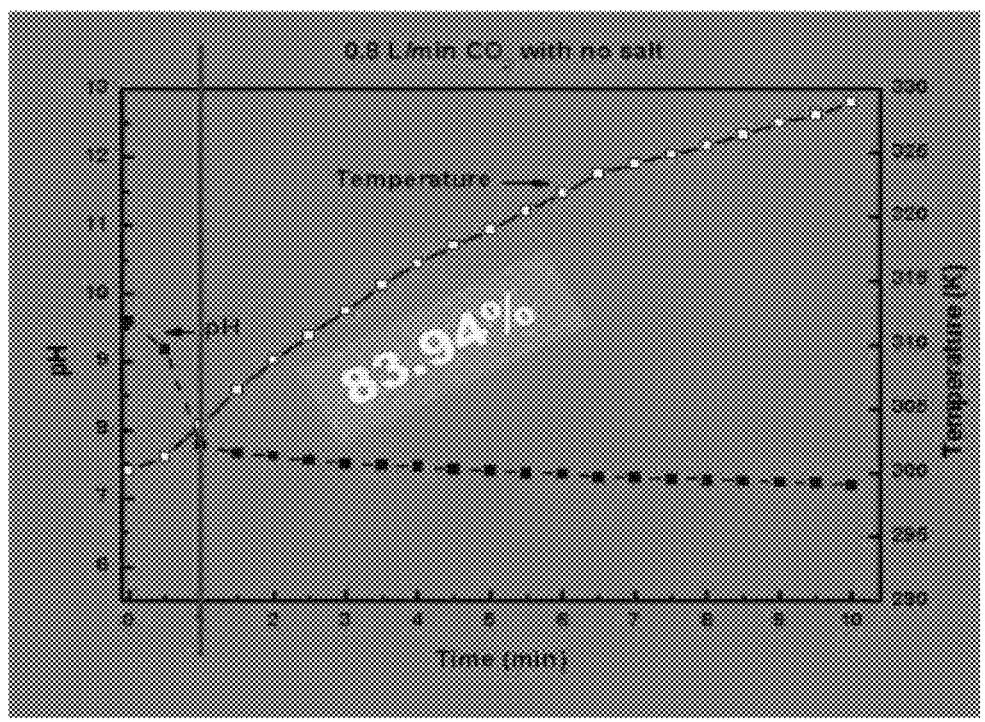
Figure 3C:
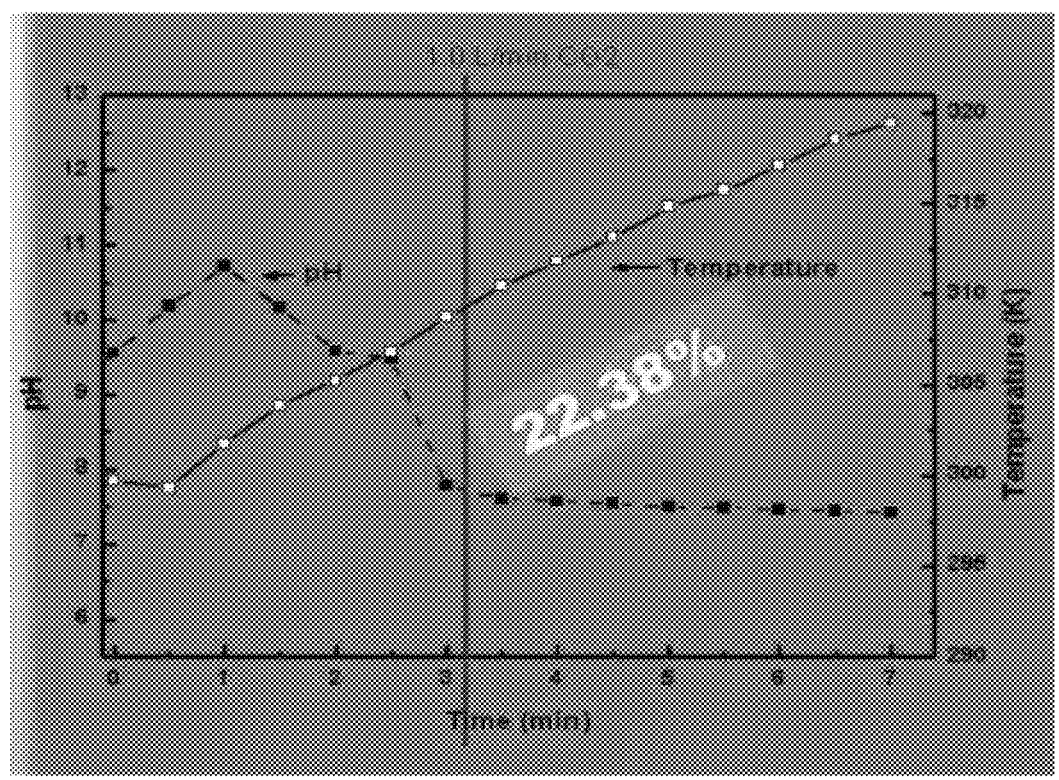
Figure 3D:
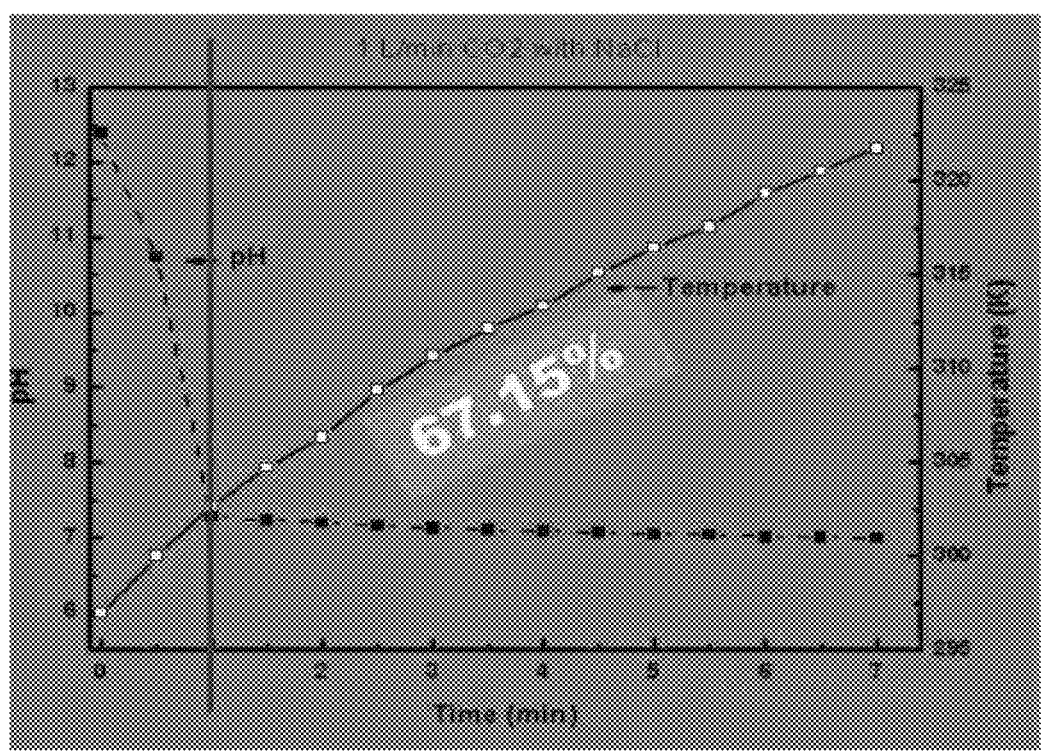
Figure 4A:
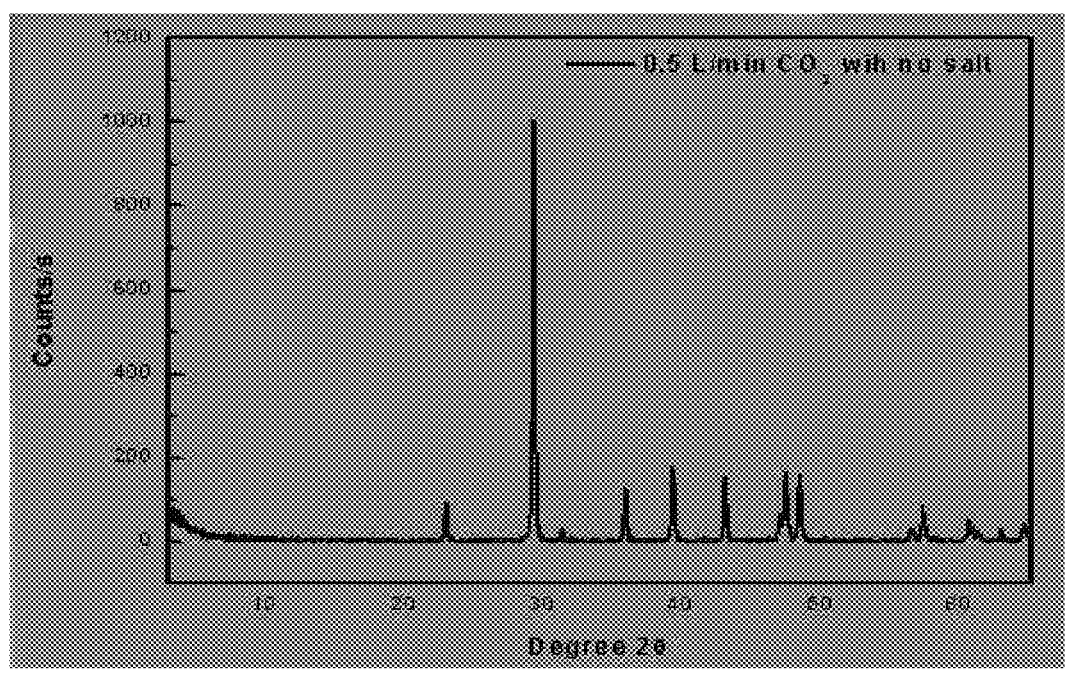
FIGS. 4A to 4D are XRD graphs of the crystals obtained after the reactions of Examples 3 to 6, respectively.
Figure 4B:
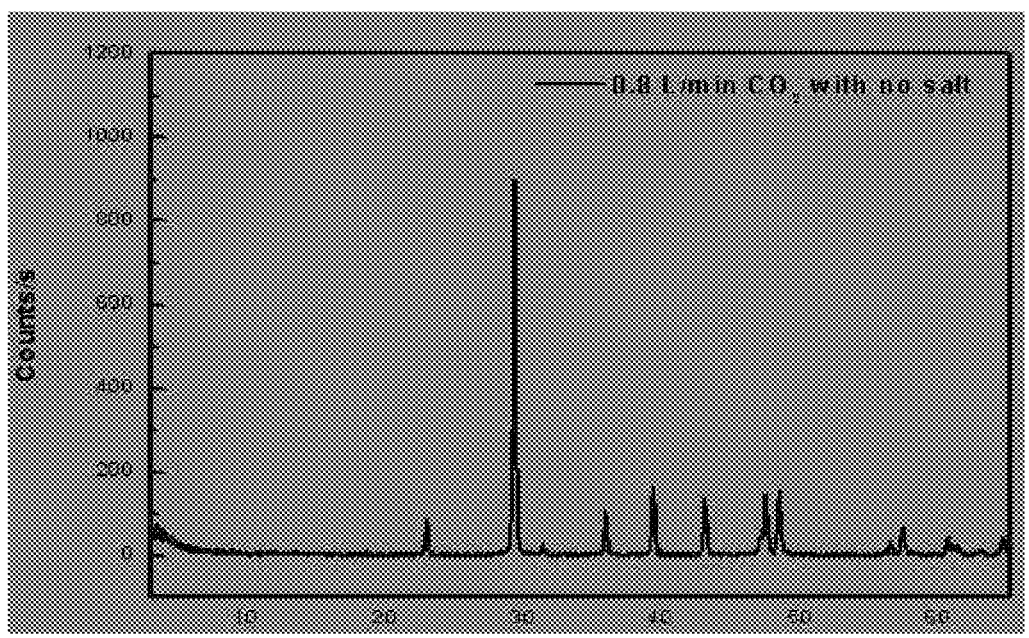
Figure 4C:
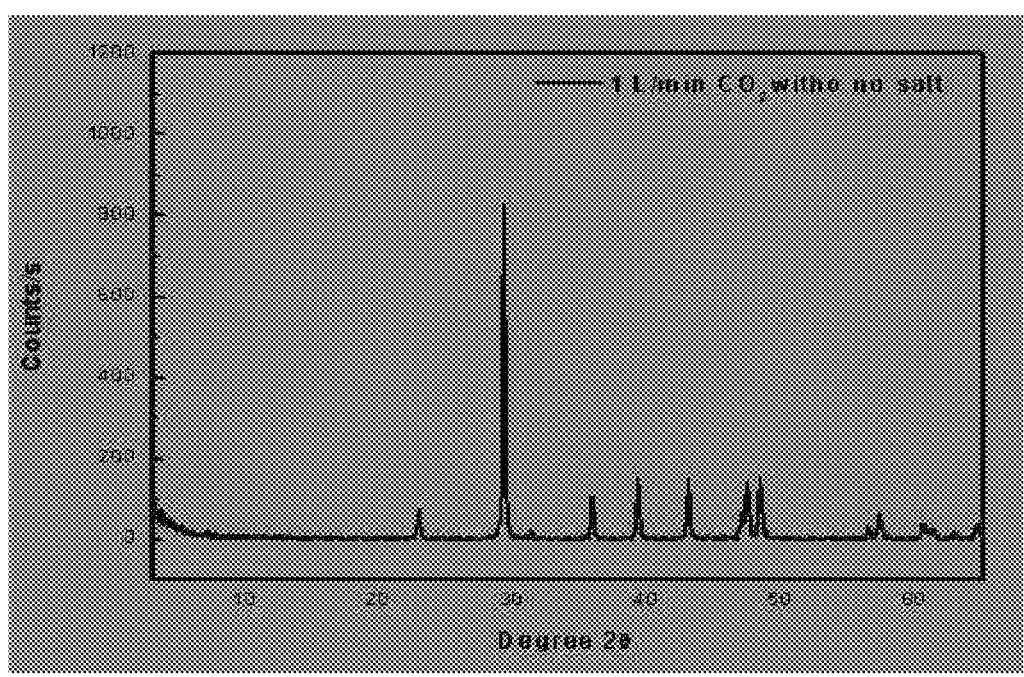
Figure 4D:
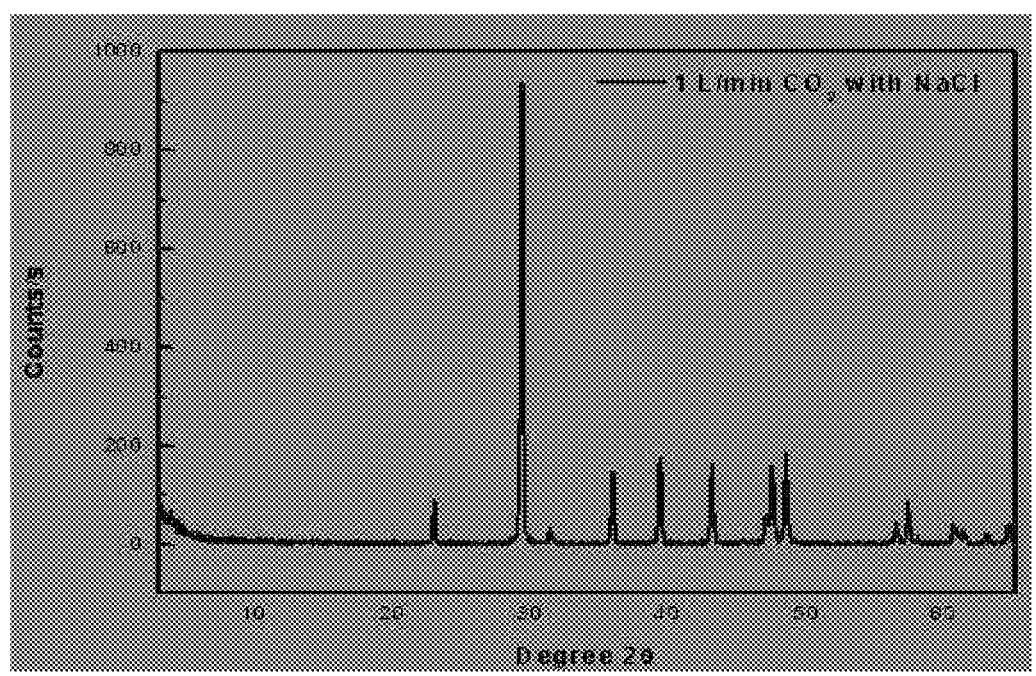
Figure 5A:
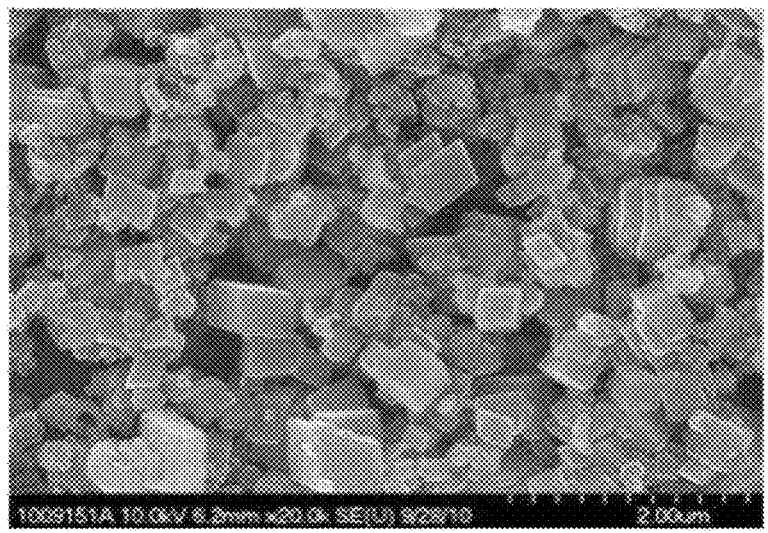
FIGS. 5A to 5D are SEM photographs of the crystals obtained after the reactions of Examples 3 to 6, respectively.
Figure 5B:
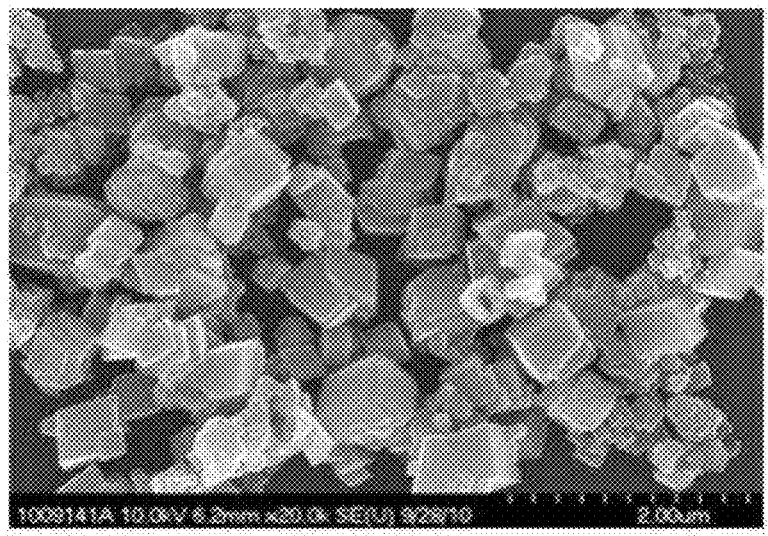
Figure 5C:
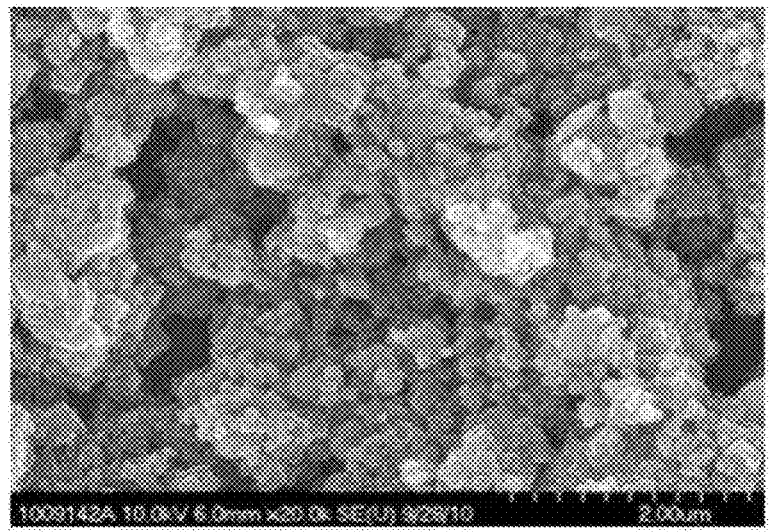
Figure 5D:
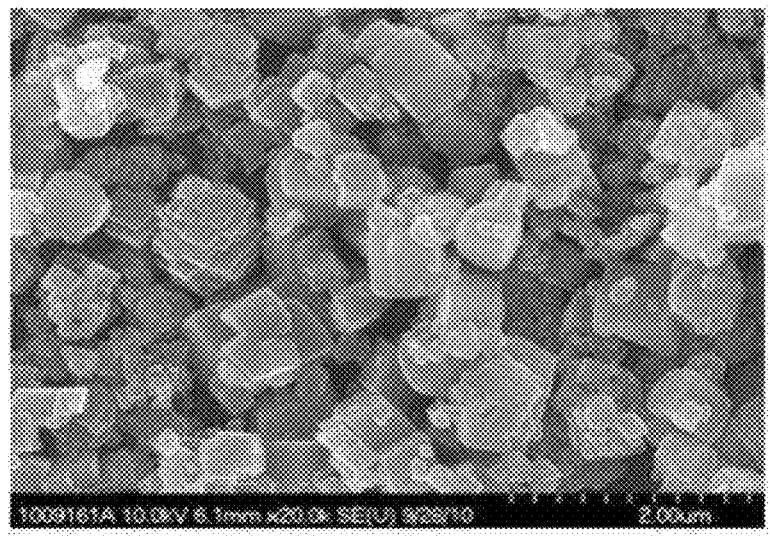
Figure 6A:
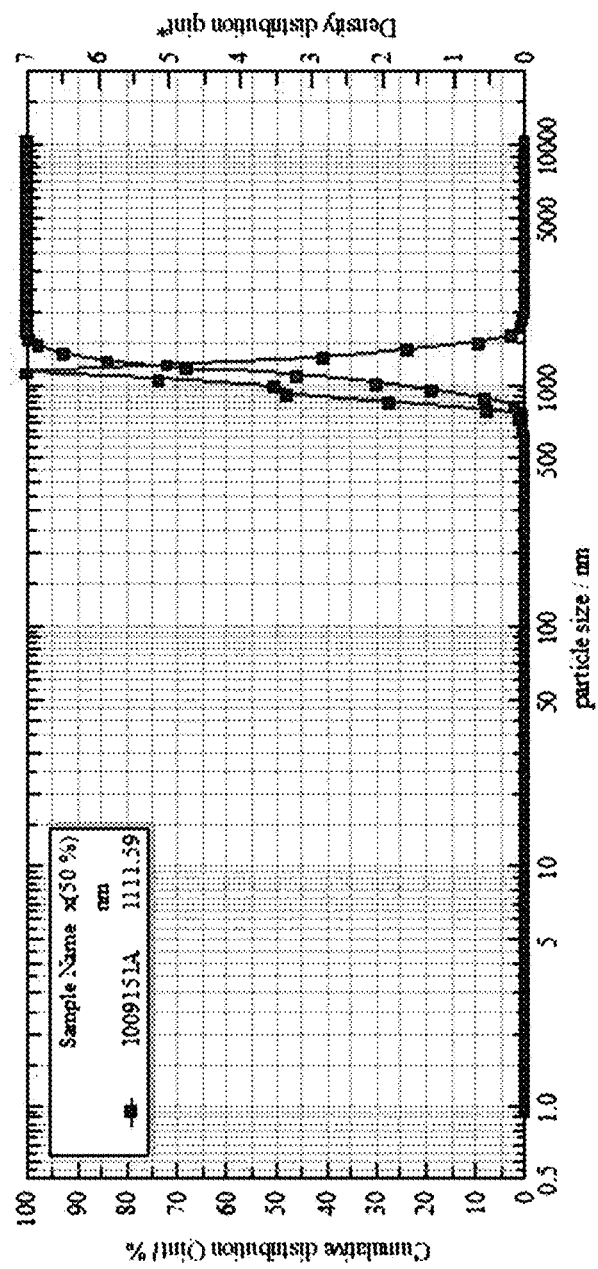
FIGS. 6A to 6D are particle size distribution graphs of the crystals obtained after the reactions of Examples 3 to 6, respectively.
Figure 6B:
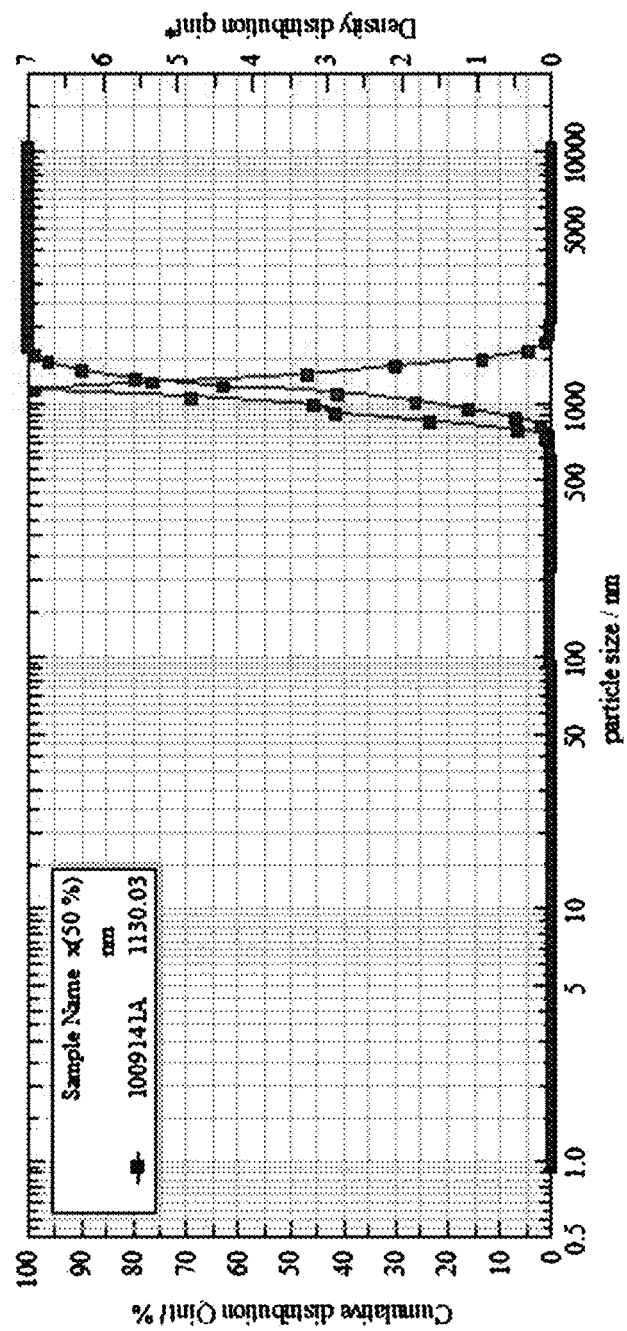
Figure 6C:
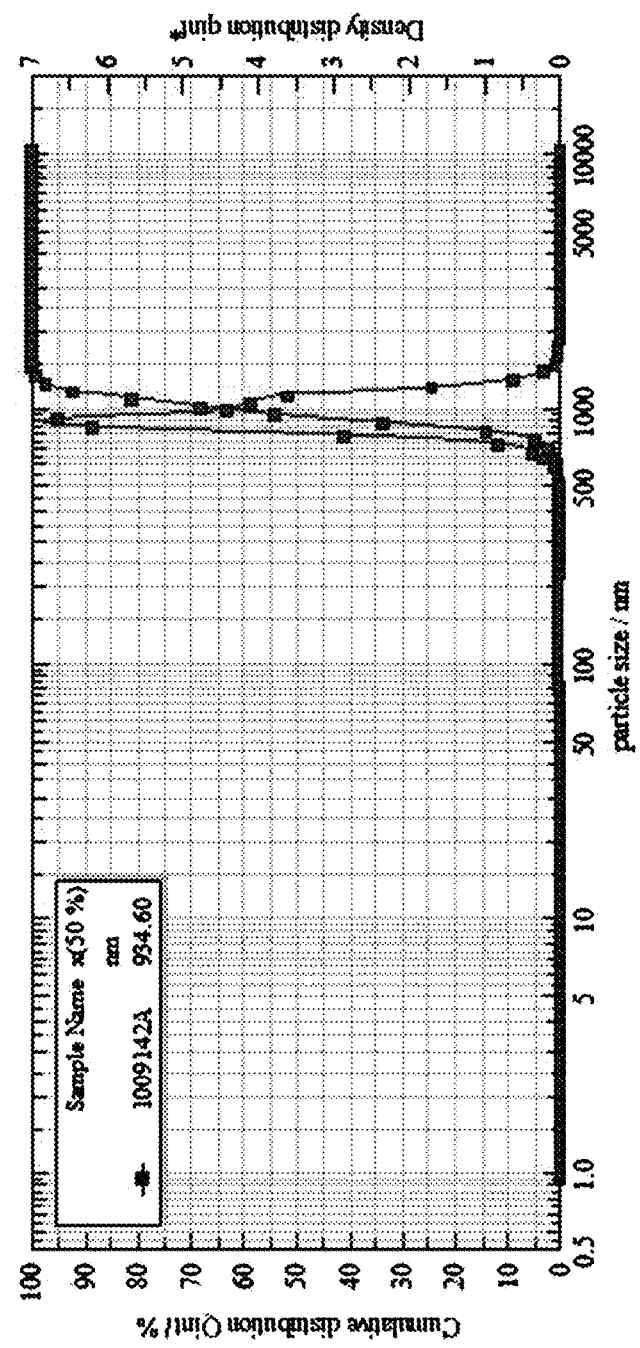
Figure 6D:
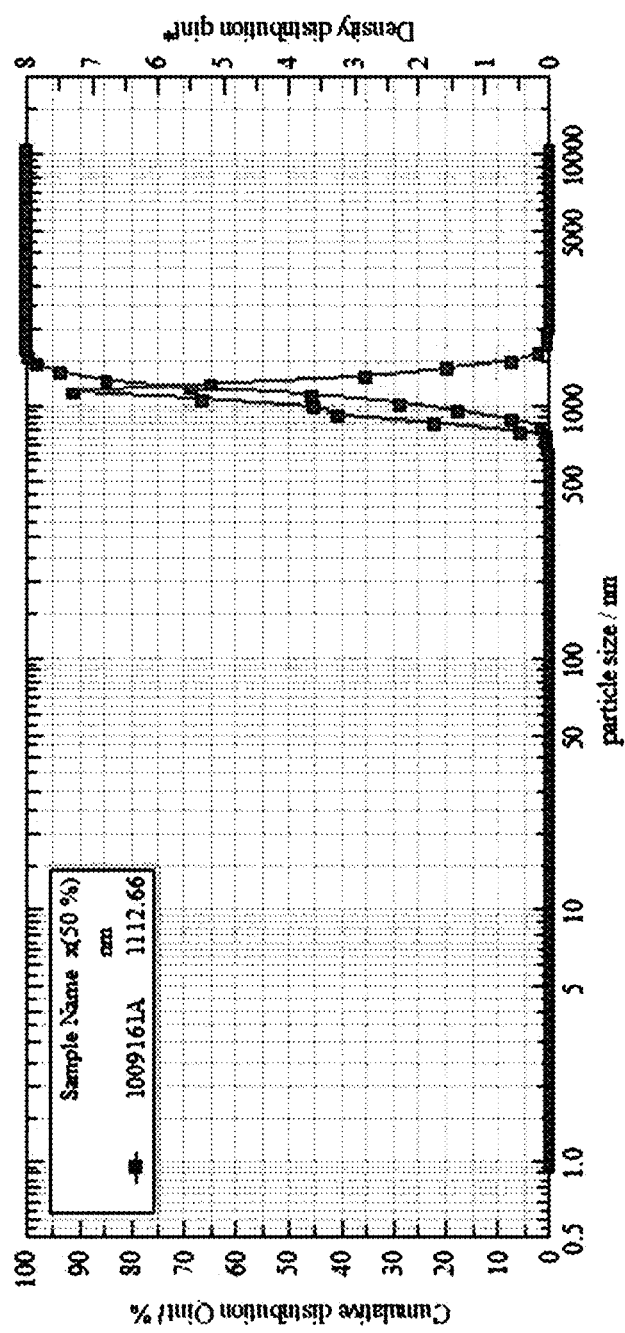

The experimental results thereof are show in FIGS. 2A to 2C. FIG. 2A to 2C compare the results (in front of arrow) before the generation of carbon dioxide microbubbles with the results (behind arrow) after the generation thereof.

FIG. 2A shows XRD graphs of the calcium carbonate crystals produced by the experiment of Example 2 before and after the generation of carbon dioxide microbubbles. As shown in FIG. 2A, it was found that, before the generation of carbon dioxide microbubbles, calcium hydroxide particles were produced immediately after adjusting the pH of the solution to 11 or more. Further, it was found that, after the generation of carbon dioxide microbubbles, calcium carbonate was produced, and that the calcium carbonate produced 25 minutes after the generation of carbon dioxide microbubbles was produced in the form of calcite. In FIG. 2A, NaCl peaks are partially observed, but calcium carbonate was entirely produced in the form of calcite.

FIG. 2B shows SEM photograph of the calcium carbonate crystals produced by the experiment of Example 2 before and after the generation of carbon dioxide microbubbles. As shown in FIG. 2B, calcium hydroxide particles were considerably conglomerated before the generation of carbon dioxide microbubbles, but calcite particles were well dispersed before the generation of carbon dioxide microbubbles.

FIG. 2C shows particle size distribution graphs of the calcium carbonate crystals produced by the experiment of Example 2 before and after the generation of carbon dioxide microbubbles. As shown in FIG. 2C, calcium hydroxide having a particle size of about 600 nm was converted into singly-dispersed calcite having a particle size of about 340 nm after the generation of carbon dioxide microbubbles. Further, the peak width thereof was very narrow, too.

As described above, from the experimental results of Examples 1 and 2, it can be found that singly-dispersed calcite particles having a particle size of nanometers can be obtained in a relative short time.

EXAMPLES 3 to 6

Production of Calcium Carbonate Using $Ca(OH)_2$

In Examples 3 to 6, unlike in Examples 1 and 2, calcium carbonate was produced without increasing the pH, that is, without adding NaOH. In this case, $Ca(OH)_2$ was used as a supply source of calcium ions instead of the $CaCl_2$ used in Examples 1 and 2.

In Examples 3 to 5, calcium carbonate was produced under the same conditions as Example 1, except that 0.03 M $Ca(OH)_2$ was used, and carbon dioxide was injected at a flow rate of 0.5 L/min (Example 3), 0.8 L/min (Example 4) and 1.0 L/min (Example 5). In Example 6, calcium carbonate was produced under the same conditions as Example 1, except that 0.03 M $Ca(OH)_2$ was used, carbon dioxide was injected at a flow rate of 1.0 L/min, and 3 mM NaCl was added.

FIGS. 3A to 3D are graphs showing the reaction profiles of Examples 3 to 6, respectively. In FIGS. 3A to 3D, the end points of reactions are indicated by vertical lines based on the starting points at which the changes in pH begin to maintain steady states.

Meanwhile, the '%' shown in each of FIGS. 3A to 3D is the conversion rate (theoretical value) of the carbon dioxide, which was injected until the end point indicated by the vertical line, into calcium carbonate, that is, calcite. After the reaction had completed, the amount of calcium in the filtered solution was analyzed and calculated. As a result, the conversion rates of carbon dioxide into calcium carbonate are 85.1%, 91.2%, 93.3% and 85.4% at carbon dioxide flow rates of 0.5 L/min, 0.8 L/min, 1.0 L/min and 1.0 L/min (NaCl added), respectively.

FIGS. 4A to 4D are XRD graphs of the calcium carbonate crystals obtained after the reactions of Examples 3 to 6, respectively. As shown in FIGS. 4A to 4D, it can be found that calcium carbonate was produced in the form of calcite.

FIGS. 5A to 5D are SEM photographs of the calcium carbonate crystals obtained after the reactions of Examples 3 to 6, respectively. As shown in FIGS. 5A to 5D, it can be found that the degree of dispersion of calcium carbonate particles is slightly decreased compared to when $CaCl_2$ was used, and the particle size thereof is slightly increased.

FIGS. 6A to 6D are particle size distribution graphs of the calcium carbonate crystals obtained after the reactions of Examples 3 to 6, respectively. As shown in FIGS. 6A to 6D, it can be found that all the calcium carbonate have a particle size of about 1 μm, and thus the particle size distribution thereof is narrow.

As described above, when the microbubble system disclosed in the present invention is used, the amount of carbon dioxide dissolved in a solvent can be increased, so that the amount of carbonate ions in the solvent is also increased, thereby increasing the production of carbonate.

Therefore, according to the microbubble system of the present invention, carbon dioxide is consumed, and cations can be effectively removed from waste water, so that it is environmentally useful.

Further, since the carbonate produced by the method of the present invention has uniform particle size, it can be practically used as high-priced building materials, filler for paper manufacturing, etc. and can also be usefully used in foods, medicines and the like according to the purity thereof, so that it is greatly advantageous economically.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of producing carbonate, comprising the steps of:
   providing a water-containing solution including calcium cations;
   injection into the water-containing solution a gas consisting essentially of carbon dioxide to generate carbon dioxide microbubbles having a diameter of 50 μm or less; and
   producing calcium carbonate through a precipitation reaction, wherein the calcium carbonate as produced is in a calcite form with a particle size of 1 μm or less;
   wherein the precipitation reaction is conducted under an alkali condition of a pH greater than 7.

2. The method of producing carbonate according to claim 1, wherein the water-containing solution is an aqueous solution.

3. The method of producing carbonate according to claim 1, wherein the water-containing solution is waste water.

4. The method of producing carbonate according to claim 1, wherein the precipitation reaction is conducted in the presence of NaCl or NaOH.

5. A method of producing carbonate, comprising the steps of
   providing a water-containing solution including calcium cations;
   adding a salt that dissociates in the solution and exhibits electrolytic properties that facilitate a precipitation reaction;
   injecting into the water-containing solution a gas consisting essentially of carbon dioxide to generate carbon dioxide microbubbles having a diameter of 50 μm or less to induce the precipitation reaction of the calcium cations with the carbonate ions; and
   producing calcium carbonate through the precipitation reaction, wherein the calcium carbonate as produced is in a calcite form with a particle size of 1 μm or less.

6. The method of producing carbonate according to claim 5, wherein the salt is NaCl.

* * * * *